UNITED STATES PATENT OFFICE.

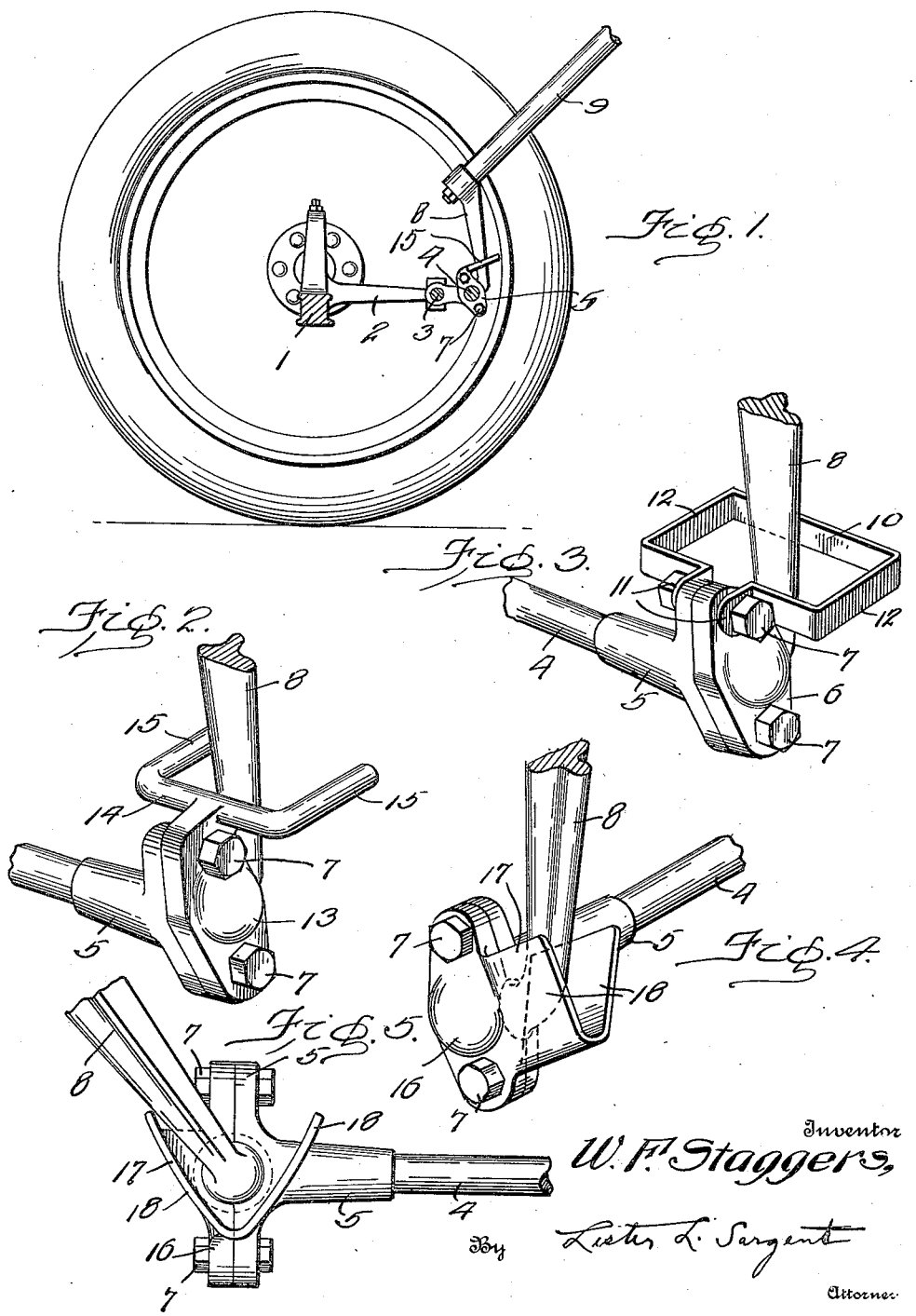

WILLIAM F. STAGGERS, OF MANNINGTON, WEST VIRGINIA.

ANTILOCK DEVICE FOR STEERING GEARS.

1,423,820.  Specification of Letters Patent.  Patented July 25, 1922.

Application filed August 15, 1921. Serial No. 492,421.

*To all whom it may concern:*

Be it known that I, WILLIAM F. STAGGERS, a citizen of the United States, residing at Mannington, in the county of Marion and State of West Virginia, have invented a new and useful Antilock Device for Steering Gears, of which the following is a specification.

The object of my invention is to provide a simple, effective and easily applied attachment for Ford automobiles which will prevent the steering arm from turning too far and causing it to pass over center that would prevent the driver from properly steering his car.

I attain these and other objects of my invention by the mechanism illustrated in the accompanying drawings, in which—

Figure 1 is a side elevation of the invention applied to a car showing its relation to the rest of the steering gear in use;

Fig. 2 is an enlarged perspective view of same;

Fig. 3 is an enlarged view of another form of the invention;

Fig. 4 is a perspective view of a modification of the form of the invention illustrated in Fig. 2; and Fig. 5 is an end elevation of the form of the invention illustrated in Fig. 4.

Like numerals indicate like parts in each of the several views.

Referring to the accompanying drawings and particularly to Fig. 1 there is illustrated the conventional front axle 1, spindle arm 2, spindle connecting rod 3, steering gear connecting rod 4 and radius rod ball socket 5. On the conventional radius rod ball socket 5 may be mounted the conventional radius rod ball cap 6 as illustrated in Fig. 3, said member being secured to socket 5 by bolt 7. In Fig. 1 is illustrated the conventional steering post 9 to which is attached the conventional steering gear ball arm 8, the ball of which seats within the ball socket 5 and the cap 6.

My invention consists of a suitable frame the sides of which engage the arm 8 before it is turned too far and prevents said frame moving to a position to cause it to pass over a dead center. In the form of the invention illustrated in Fig. 3, I provide the stop frame 10 of rectangular shape, the sides 12 of which are adapted to engage the arm 8 and limit its movement, the frame being attached to members 5 and 6 by the perforated ears 11 which are engaged by the bolt 7 as illustrated.

I may, however, form the stop frame integrally with the radius rod ball cap, as illustrated in Fig. 2, in which the cap 13 carries the perforated integral stop frame 14, the sides 15 of which limit the movement of the arm 8.

In Figs. 4 and 5 I have illustrated a modification of the invention having the V-shaped stop frame 17, one of the sides 18 of which is formed integral with the cap 16. The sides 18 function as to the sides 15 and the sides 12 to limit the turning movement of the arm 8.

In operation when the steering arm is turned its movement is limited in either direction by its abutment against the sides of the stop frame (either sides 12, sides 15, or sides 18 depending on the form of the invention employed) and the driver of the automobile is prevented from turning the steering wheel to a point that might cause it to pass over center of the steering arm and thus make it impossible for the driver to properly steer his car.

Heretofore it has been possible to keep on turning the steering wheel of the Ford automobile until the steering arm passed over the center and thus prevented the proper steering of the machine, and which has been the cause of many of the accidents that have occurred with this type of automobile.

What I claim is—

1. A device for preventing the steering wheel of an automobile of the type described from turning to a point likely to cause it to pass over a dead center, consisting of a stop frame having sides suitably spaced from the steering arm to limit its movement beyond a predetermined degree, said means being positioned on the cap of the ball socket which the steering arm engages.

2. An anti-lock device for the steering wheel of a Ford automobile, the combination of a stop frame connected with the cap of the radius rod socket, said arm having sides spaced on either side of the steering arm at a suitable distance from said arm to limit its turning movement beyond a predetermined point, substantially as and for the purposes described.

WILLIAM F. STAGGERS.